Patented Dec. 8, 1931

1,835,393

UNITED STATES PATENT OFFICE

WINFRID HENTRICH, OF WIESDORF-ON-THE-RHINE, AND RUDOLF KNOCHE, OF LEVER-KUSEN-ON-THE-RHINE, AND FRITZ BALLAUF, OF ELBERFELD, GERMANY, ASSIGNORS TO GENERAL ANILINE WORKS, INC., OF NEW YORK, N. Y., A CORPORATION OF DELAWARE

NEW MONOAZODYESTUFFS

No Drawing. Application filed January 28, 1929, Serial No. 335,737, and in Germany February 1, 1928.

The present invention relates to new monoazodyestuffs, more particularly it relates to azodyestuffs of the general formula:

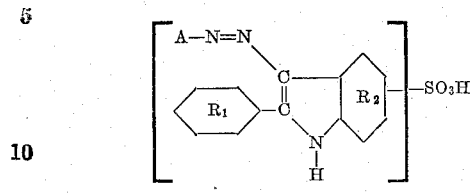

wherein A stands for a benzene nucleus, wherein the sulfo group stands in one of the benzene nuclei $R_1$ and $R_2$ and wherein A, $R_1$ and $R_2$ may be substituted by sulfonic acid groups, substituted amino groups or halogen.

The alkali metal salts of our new dyestuffs may be prepared by diazotizing any amine of the aromatic series, in the usual manner with sodium nitrite in hydrochloric acid solution and coupling the diazo compound in alkaline solution with a 2-phenyl-indol-sulfonic acid, salting out the dyestuff formed, filtering and drying it.

The dyestuffs are, when dry and in a pulverized form, yellow powders; the alkali metal salts of the dyestuffs are soluble in water. From an acid bath they generally dye wool powerful yellow to orange shades of excellent fastness to light and excellent fastness to fulling. The favorable behaviour of the new dyestuffs in both normal and sharp fulling combined with sufficient capacity for even dyeing represents a technical advantage as compared with known monoazo dyestuffs of similar structure.

Upon careful reduction with stannous chloride and hydrochloric acid they yield the initial component, that means an aromatic amine, and a 2-phenyl-3-amino-indol-sulfonic acid.

The following examples will illustrate our invention without limiting it thereto:

*Example 1.*—The diazo solution from 178 parts by weight of 4-amino-acetyl-ethylaniline is run with stirring into a solution, rendered alkaline with sodium carbonate, of 295 parts by weight of sodium 2-phenylindol-7-sulfonate of the formula:

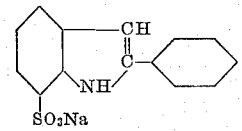

The coupling is complete after a few hours. The dyestuff having in its free state the following formula:

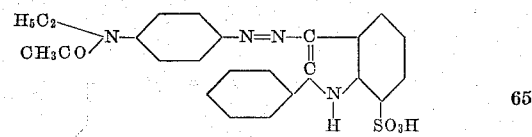

is salted out, pressed and dried.

It dyes wool from an acid bath, powerful, clear yellow shades of excellent fastness to light, satisfactory evenness, suitable for good normal and strong fulling, and moreover displays in admixture with acid blue alizarine dyestuffs, for example alizarine pure blue B (Schultz, Farbstofftabellen 1923, No. 855) a favorable behaviour to light.

*Example 2.*—195 parts by weight of 2.4.6-trichloro-1-aminobenzene are diazotized and added to a solution, rendered alkaline with sodium carbonate, of 273 parts by weight of 2-phenylindol sulfonic acid of the formula:

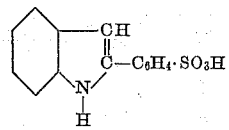

The dyestuff having in its free state the following formula:

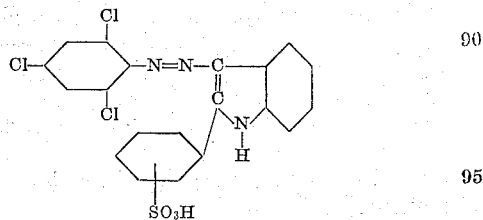

is isolated by salting out and pressing and is then dried.

It dyes wool from an acid bath a powerful even orange of excellent fastness to light.

Normal and strong fulling are very good.

We claim:

1. As new products the monoazodyestuffs of the following general formula:

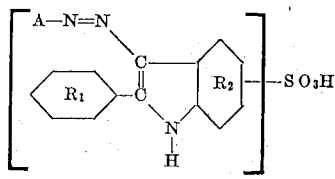

wherein A stands for a benzene nucleus, wherein the sulfo group stands in one of the benzene nuclei $R_1$ and $R_2$ and wherein A, $R_1$ and $R_2$ may be substituted by substituents of the group consisting of halogen, the sulfonic acid and substituted amino groups, said dyestuffs being generally yellow powders, being in the form of their alkali metal salts soluble in water, dyeing wool from an acid bath clear yellow to orange shades of good fastness to light and fulling, and yielding upon reduction with stannous chloride and hydrochloric acid an aromatic amine and a 2-phenyl-3-amine-indol-sulfonic acid.

2. As new products the monoazodyestuffs of the following general formula:

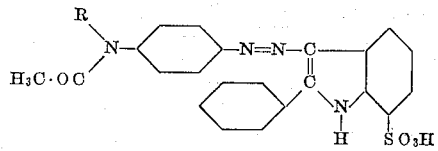

wherein R stands for an alkyl group, said dyestuff being generally yellow powders, being in the form of their alkali metal salts soluble in water, dyeing wool from an acid bath clear yellow to orange shades of good fastness to light and fulling, and yielding upon careful reduction with stannous chloride and hydrochloric acid a 4-amino-acetyl-alkyl-aniline and a 2-phenyl-3-amino-indol-sulfonic acid.

3. As a new product the monoazodyestuff of the following formula:

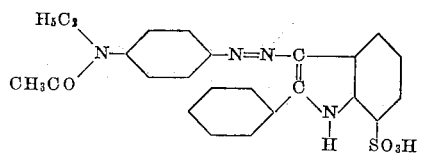

being a yellow powder, being in the form of its alkali metal salts soluble in water, dyeing wool from an acid bath clear yellow shades of good fastness to light and fulling, and yielding upon careful reduction with stannous chloride and hydrochloric acid 4-amino-acetyl-ethylaniline and 2-phenyl-3-amino-indol-7-sulfonic acid.

In testimony whereof we have hereunto set our hands.

WINFRID HENTRICH. [L. S.]
RUDOLF KNOCHE. [L. S.]
FRITZ BALLAUF. [L. S.]